United States Patent
Jain

(10) Patent No.: US 10,922,490 B2
(45) Date of Patent: Feb. 16, 2021

(54) SYSTEM AND METHOD FOR AUTHORING ELECTRONIC MESSAGES

(71) Applicant: Microsoft Technology Licensing, LLC, Redmond, WA (US)

(72) Inventor: Varun Jain, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 56 days.

(21) Appl. No.: 15/630,287

(22) Filed: Jun. 22, 2017

(65) Prior Publication Data

US 2018/0373697 A1 Dec. 27, 2018

(51) Int. Cl.
*G06F 40/30* (2020.01)
*H04L 12/58* (2006.01)
(Continued)

(52) U.S. Cl.
CPC ............ *G06F 40/30* (2020.01); *G06F 40/157* (2020.01); *G06F 40/166* (2020.01);
(Continued)

(58) Field of Classification Search
CPC .............. G06F 17/30; G06F 17/30864; G06F 17/2735; G06F 17/2264; G06F 17/271; G06F 17/2765; G06F 17/279; G06F 17/2881; G06F 17/30528; G06F 17/2775; G06F 17/30743; G06F 3/048; G06F 17/2705; G06F 17/2725; G06F 17/2755; G06F 17/289; G06F 17/30011; G06F 17/30654; G06F 17/30675; G06F 17/30699; G06F 3/167; G06F 17/2229; G06F 17/24; G06F 17/274; G06F 17/276; G06F 17/277; G06F 17/2795; G06F 17/3053; G06F 17/3061; G06F 17/30616; G06F 17/30637; G06F 17/30657; G06F 17/30663;
(Continued)

(56) References Cited

U.S. PATENT DOCUMENTS 7,360,151 B1 4/2008 Froloff
8,024,414 B2 9/2011 Adams et al.
(Continued)

OTHER PUBLICATIONS

"Custom Email Templates", https://support.adelphi.edu/help/FootPrintsHelp/content/custom_email_templates.htm, Retrieved on: Apr. 18, 2017, 3 pages.
(Continued)

*Primary Examiner* — Abdelali Serrou
(74) *Attorney, Agent, or Firm* — Michael Best & Friedrich LLP

(57) ABSTRACT

Systems, methods and apparatus for authoring an electronic message. In one example, the system, method, and apparatus include receiving an electronic message; categorizing the electronic message based on a message layout type associated with the electronic message; determining, with a sentiment analyzer, a sentiment type and a sentiment score associated with the electronic message; identifying a first plurality of words in the electronic message associated with the sentiment type; and outputting one or more selected from the group consisting of the message layout type, the sentiment type, and the sentiment score associated with the electronic message.

22 Claims, 7 Drawing Sheets

(51) Int. Cl.
*G06F 40/56* (2020.01)
*G06F 40/157* (2020.01)
*G06F 40/166* (2020.01)
*G06F 40/247* (2020.01)
*G06F 40/253* (2020.01)

(52) U.S. Cl.
CPC .......... *G06F 40/247* (2020.01); *G06F 40/253* (2020.01); *G06F 40/56* (2020.01); *H04L 51/063* (2013.01)

(58) Field of Classification Search
CPC ......... G06F 17/30684; G06F 17/30702; G06F 17/30705; G06F 17/30719; G06F 17/30867; G06F 21/6254; G06F 17/2785; G10L 25/63; G10L 15/1815; G10L 13/02; G10L 15/26; G10L 13/04; G10L 15/1822; G10L 19/0018; G10L 13/00; G10L 13/08; G10L 13/10; G10L 15/08; G10L 2015/088; G10L 21/10; G10L 13/0335; G10L 13/07; G10L 2013/105; G10L 13/027; G10L 13/033; G10L 13/047; G10L 15/02; G10L 15/063; G10L 15/30; G10L 2015/0638; G10L 25/72
See application file for complete search history.

(56) References Cited

U.S. PATENT DOCUMENTS

| | | | |
|---|---|---|---|
| 8,495,503 | B2 | 7/2013 | Brown et al. |
| 9,092,742 | B1* | 7/2015 | Zeng ..................... H04L 51/30 |
| 2004/0107089 | A1 | 6/2004 | Gross et al. |
| 2010/0082751 | A1 | 4/2010 | Meijer et al. |
| 2010/0223341 | A1 | 9/2010 | Manolescu et al. |
| 2012/0011208 | A1 | 1/2012 | Erhart et al. |
| 2012/0047447 | A1 | 2/2012 | Haq |
| 2013/0120429 | A1* | 5/2013 | Sukup ............... H04M 1/72552 345/589 |
| 2013/0124192 | A1* | 5/2013 | Lindmark ............ G06F 17/274 704/9 |
| 2013/0143185 | A1* | 6/2013 | Liu ........................ G09B 19/00 434/236 |
| 2013/0152000 | A1* | 6/2013 | Liu ........................ G06F 3/048 715/765 |
| 2013/0231920 | A1* | 9/2013 | Mathew ............ G06F 17/30705 704/9 |
| 2013/0253910 | A1 | 9/2013 | Turner et al. |
| 2014/0140497 | A1* | 5/2014 | Ripa ...................... H04M 3/5133 379/265.06 |
| 2014/0149328 | A1* | 5/2014 | Posse ....................... G06N 5/02 706/46 |
| 2015/0180818 | A1* | 6/2015 | Chen ....................... H04L 51/32 715/751 |
| 2015/0242391 | A1* | 8/2015 | Goel ....................... G06F 40/30 704/9 |
| 2016/0050166 | A1 | 2/2016 | Smith |
| 2016/0147731 | A1 | 5/2016 | Parikh et al. |
| 2016/0285810 | A1* | 9/2016 | Bai ........................ H04L 51/16 |
| 2016/0352895 | A1* | 12/2016 | Son ........................ H04L 51/04 |
| 2016/0366088 | A1* | 12/2016 | Abou Mahmoud .. H04L 67/306 |
| 2017/0242919 | A1* | 8/2017 | Chandramouli .. G06F 17/30867 |
| 2017/0262431 | A1* | 9/2017 | Alam .................. G06F 17/2785 |
| 2017/0329972 | A1* | 11/2017 | Brisebois ............ G06F 21/6218 |
| 2017/0364508 | A1* | 12/2017 | Abrahams ............ G06F 17/289 |
| 2018/0060338 | A1* | 3/2018 | DeLuca ............. G06F 16/9535 |
| 2018/0122361 | A1* | 5/2018 | Silveira Ocampo ........................ G10L 13/0335 |
| 2018/0217968 | A1* | 8/2018 | Bastide ................ G06F 17/241 |
| 2018/0226071 | A1* | 8/2018 | Winter ................ G10L 15/1815 |
| 2018/0248746 | A1* | 8/2018 | Deluca .................... G06F 40/35 |
| 2018/0286429 | A1* | 10/2018 | Bostick .................. A61B 5/165 |
| 2018/0331989 | A1* | 11/2018 | Bastide ................... H04L 51/18 |

OTHER PUBLICATIONS

"International Search Report and Written Opinion Issued in PCT Application No. PCT/US2018/034000", dated Nov. 6, 2018, 12 Pages.

Taboada, Maite, "Sentiment Analysis: An Overview from Linguistics", In Annual Review of Linguistics, vol. 2, Issue 1, Sep. 21, 2015, pp. 325-347.

* cited by examiner

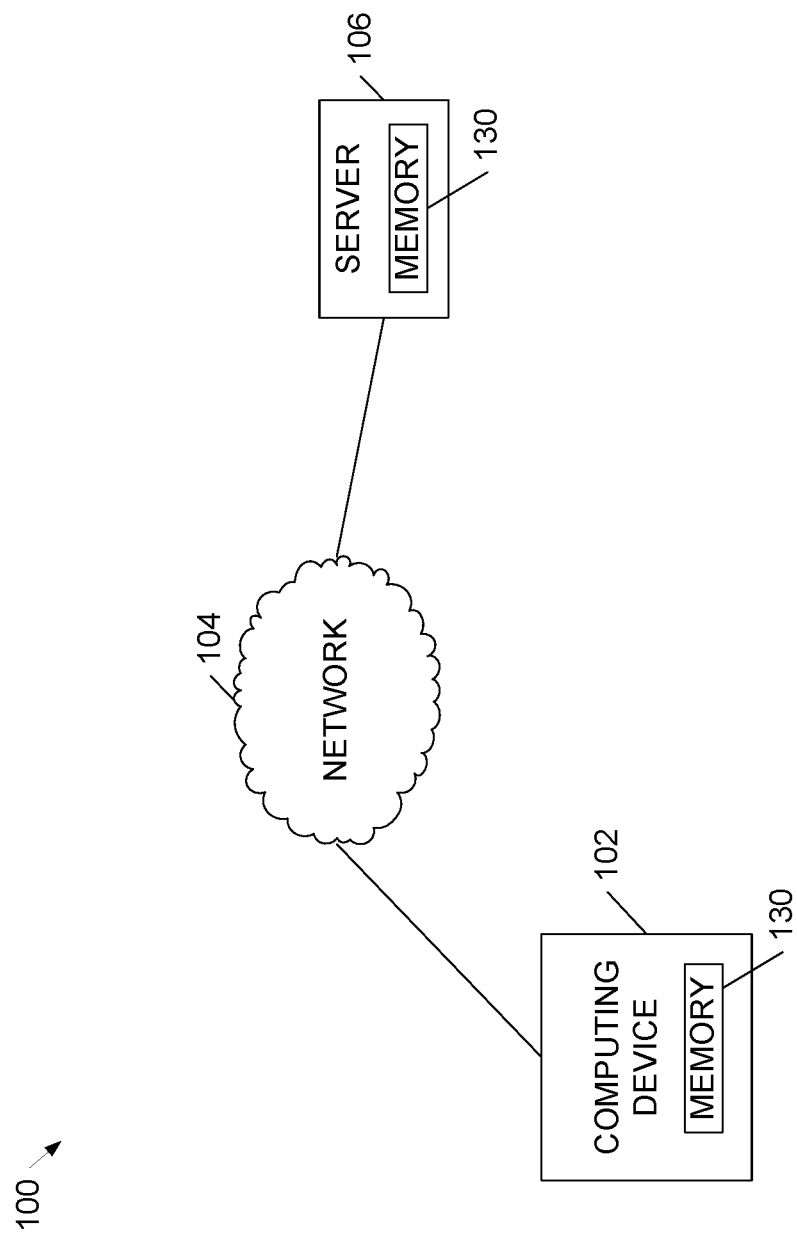

SYSTEM AND METHOD FOR AUTHORING ELECTRONIC MESSAGES

FIELD

Embodiments described herein relate to systems and methods for authoring electronic messages.

BACKGROUND

Electronic messages (for example, email and text messages) provide a valuable type of communication. However, many people that use electronic messages do so without understanding the appropriate way of conveying an intended meaning, particularly if the electronic message is written in a person's non-native language. As a consequence, miscommunication may occur. For example, a recipient of poorly written electronic message may often misunderstand the purport of the message and the misunderstanding may lead to an unfavorable outcome. The sender may intend one sentiment but the literal language of the electronic message may convey a different, unintended sentiment. Unfavorable outcomes are more likely when the recipient of the electronic message is not fully aware of the sender's fluency in the language of the electronic message. Of course, electronic messages often limit the recipient's ability to view or hear the sender to determine the emotional context with which the sender created the electronic message.

SUMMARY

Currently available electronic messaging systems do not analyze the sentiment of an outgoing message and determine the sentiment of an electronic message. Additionally, these systems also do not provide a user a mechanism to change the sentiment of the outgoing message, for example, by providing automatic suggestions for key words within the electronic message. There are many non-English speaking individuals who do not completely understand the correct way to convey sentiment or meaning using electronic messages. When communicating in English, non-native users of the language may fail to (i) choose the right set of words to convey an intended message with the appropriate emotion or sentiment, and (ii) choose the right layout (for example, a formal layout type versus an informal layout type) to convey the intended message.

Systems and methods are provided herein that, among other things, assist a user to author electronic messages that includes the appropriate sentiment desired by the user. In one example, as soon as a user types an electronic message using a computing system, the computing system runs a background call to find out as to what the sentiment of the electronic message would be or is. Upon determining the sentiment (for example, a numerical score to distinguish between a positive sentiment versus a negative sentiment), the computing system is configured to provide options to the user that assist the user in generating an electronic message to convey the intended sentiment of the user.

One embodiment provides a computing device comprising a display device displaying a graphical user interface including an electronic message. The computing device also includes an electronic processor executing instructions to receive the electronic message; categorize the electronic message based on a message layout type associated with the electronic message; determine, with a sentiment analyzer, a sentiment type and a sentiment score associated with the electronic message; identify one or more words in the electronic message associated with the sentiment type; and output at least one selected from the group consisting of the message layout type, sentiment type, and the sentiment score associated with the electronic message.

Another embodiment provides a method for receiving, with an electronic processor, the electronic message and categorizing the electronic message based on a message layout type of the electronic message. The method also includes determining, with a sentiment analyzer, a sentiment type and a sentiment score associated with the electronic message, identifying, with the electronic processor, a first plurality of words in the electronic message associated with the sentiment type; determining, with the electronic processor, a second plurality of words for replacing the first plurality of words and changing the sentiment score of the electronic message; determining, with the electronic processor, the sentiment score of the electronic message having the second plurality of words replacing the first plurality of words; and outputting an item selected from the group consisting of the message layout type, the sentiment type, and the sentiment score of the electronic message having the second plurality of words.

Another embodiment provides a non-transitory computer-readable medium containing computer-executable instructions that when executed by one or more processors cause the one or more processors to receive an electronic message; categorize the electronic message based on a message layout type of the electronic message; determine, with a sentiment analyzer, a first sentiment type and a first sentiment score associated with the electronic message; identify, with the sentiment analyzer, a first plurality of words in the electronic message associated with the first sentiment; and output one or more selected from the group consisting of the message layout type of the electronic message, the first sentiment type of the electronic message, and first the sentiment score associated with the electronic message.

Other aspects of the various embodiments provided herein will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 1A illustrates a system in accordance with some embodiments.

Figure 1B:
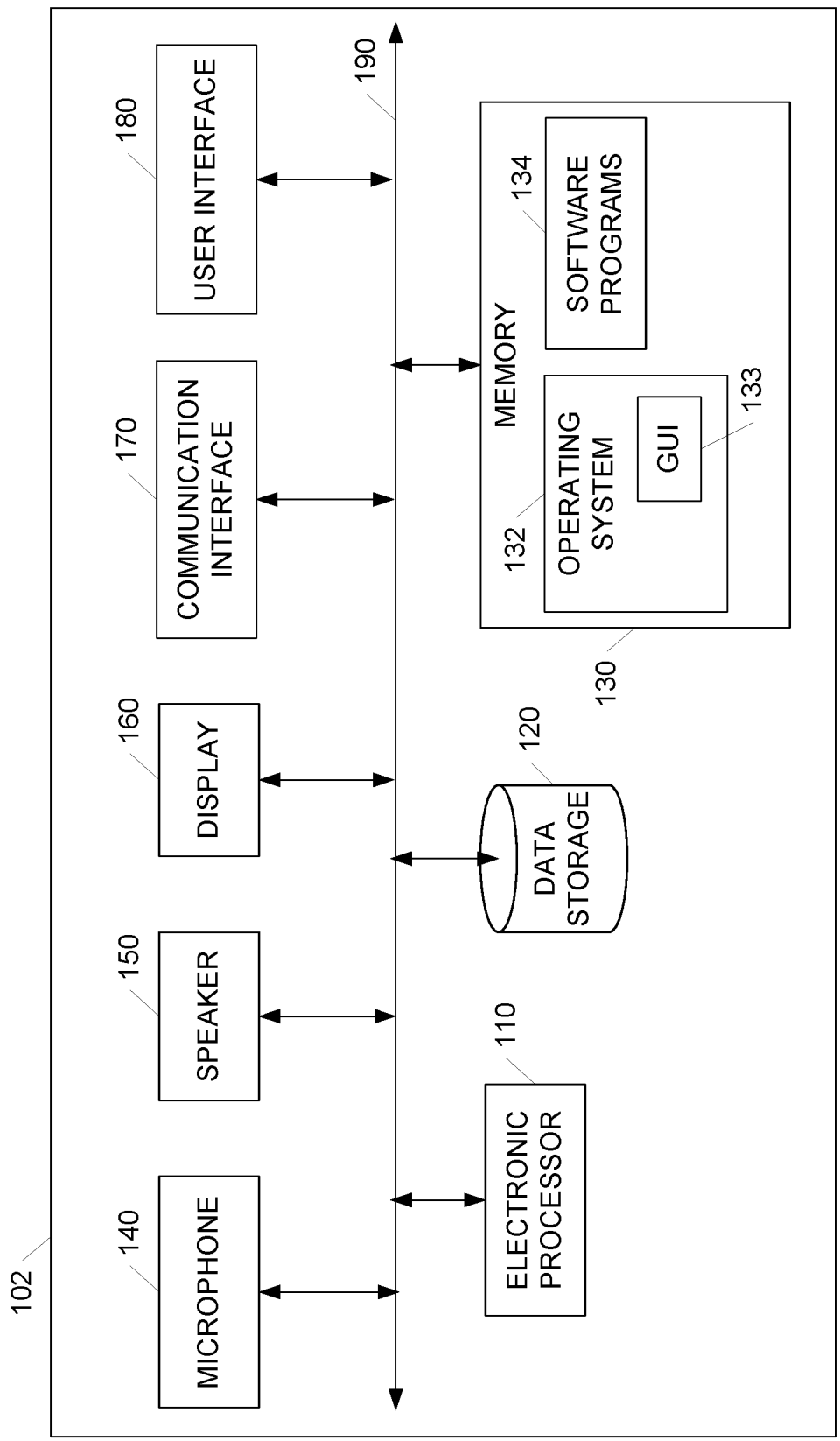
FIG. 1B illustrates a block diagram of the computing device shown in FIG. 1A, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments provided herein.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. It should also be noted that a plurality of hardware and software based devices may be utilized to implement various embodiments.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Some embodiments may include other computer system configurations, including hand-held devices, multiprocessor systems and distributed computing environments where tasks are performed by remote processing devices that are linked through a communications network. In a distributed environment, program modules may be located in both local and remote memory storage devices.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1A illustrates a system 100 in accordance with some embodiments. System 100 includes a computing device 102 in communication with a server 106 via a network 104.

FIG. 1B illustrates a block diagram of the computing device 102 in accordance with some embodiments. The computing device 102 may combine hardware, software, firmware, and system on-a-chip technology to implement the method of authoring an electronic message as provided herein. In some embodiments, the computing device 102 includes an electronic processor 110, a data storage device 120, a memory 130, a microphone 140, a speaker 150, a display 160, a communication interface 170, a user interface 180 that can include a variety of components for example, an electronic mouse, a keyboard, a trackball, a stylus, a touch-pad, a touchscreen, a graphical user interface (GUI)) and others. The computing device 102 also includes a bus 190 that interconnects the components of the device.

In the example illustrated the memory 130 includes an operating system 132 and one or more software programs 134 that retrieve various content and automatically generate a document associated with the vocalization. In some embodiments, the operating system 132 includes a graphical user interface (GUI) program or GUI generator 133 that provides a human-computer interface. The graphical user interface generator 133 may cause an interface to be displayed that includes icons, menus, text, and other visual indicators or graphical representations to display information and related user controls. In some embodiments, the graphical user interface generator 133 is configured to interact with a touchscreen to provide a touchscreen-based user interface. In one embodiment, the electronic processor 110 may include at least one microprocessor and be in communication with at least one microprocessor. The microprocessor interprets and executes a set of instructions stored in the memory 130. The one or more software programs 134 may be configured to implement the methods described herein. In some embodiments, the memory 130 includes, for example, random access memory (RAM), read-only memory (ROM), and combinations thereof. In some embodiments, the memory 130 has a distributed architecture, where various components are situated remotely from one another, but may be accessed by the electronic processor 110.

The data storage device 120 may include a non-transitory, machine-readable storage medium that stores, for example, one or more databases. In one example, the data storage device 120 also stores executable programs, for example, a set of instructions that when executed by one or more processors cause the one or more processors to perform the one or more methods describe herein. In one example, the data storage device 120 is located external to the computing device 102.

The communication interface 170 provides the computing device 102 a communication gateway with an external network (for example, a wireless network, the internet, etc.). The communication interface 170 may include, for example, an Ethernet card or adapter or a wireless local area network (WLAN) integrated circuit, card or adapter (for example, IEEE standard 802.11a/b/g/n). The communication interface 170 may include address, control, and/or data connections to enable appropriate communications with the external network.

The user interface 180 provides a mechanism for a user to interact with the computing device 102. As noted above, the user interface 180 includes input devices such as a keyboard, a mouse, a touch-pad device, and others. In some embodiments, the display 160 may be part of the user interface 180 and may be a touchscreen display. In some embodiments, the user interface 180 may also interact with or be controlled by software programs including speech-to-text and text-to-speech interfaces. In some embodiments, the user interface 180 includes a command language interface, for example, a software-generated command language interface that includes elements configured to accept user inputs, for example, program-specific instructions or data. In some embodiments, the software-generated components of the user interface 180 includes menus that a user may use to choose particular commands from lists displayed on the display 160.

The bus 190, or other component interconnection, provides one or more communication links among the components of the computing device 102. The bus 190 may be, for example, one or more buses or other wired or wireless connections. The bus 190 may have additional elements, which are omitted for simplicity, such as controllers, buffers (for example, caches), drivers, repeaters, and receivers, or other similar components, to enable communications. The bus 190 may also include address, control, data connections, or a combination of the foregoing to enable appropriate communications among the aforementioned components.

In some embodiments, the electronic processor 110, the display 160, and the memory 130, or a combination thereof may be included in one or more separate devices. For example, in some embodiments, the display may be included in the computing device 102 (for example, a portable communication device such as a smart phone, tablet, etc.), which is configured to transmit an electronic message to a server 106 including the memory 130 and one or more other components illustrated in FIG. 1. In this configuration, the electronic processor 110 may be included in the portable communication device or another device that communicates with the server 106 over a wired or wireless network or connection.

Figure 2:
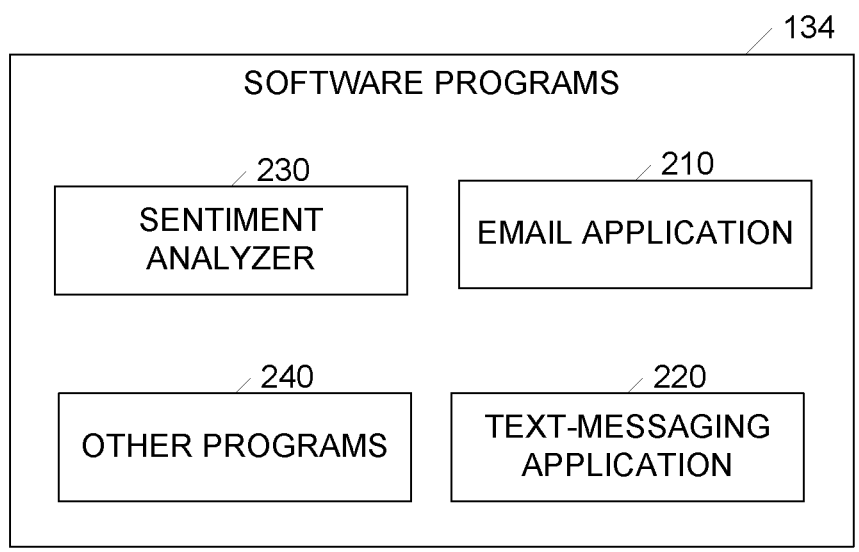
FIG. 2 illustrates various software programs stored in the memory shown in FIG. 1A and FIG. 1B, in accordance with some embodiments.

FIG. 2 illustrates various software programs stored in the memory 130 shown in FIG. 1, in accordance with some embodiments. In the example shown, the software programs 134 include an email application 210, and a text messaging application 220, a sentiment analyzer 230, and other programs 240. In some embodiments, the electronic processor 110 may be included in the computing device 102 and may execute the software programs 134 stored on the server 106 to access and process data as described herein. In some embodiments, the electronic processor 110 may execute the software programs 134, which a user may access through a software application, such as a browser application or a mobile application) executed by the computing device 102 of the user. In some embodiments, a user may execute a software program on his or her computing device 102 to communicate with another software program executed by an electronic processor included in a remote server (for example, server 106).

In some embodiments, the electronic processor 110 executes a software program 134 that is locally stored in the memory 130 of the computing device 102 to perform the methods described herein. For example, the electronic processor 110 may execute the software programs 134 to access and process data (for example, electronic messages, user profile, etc.) stored in the memory 130 and/or the data storage device 120. Alternatively or in addition, the electronic processor 110 may execute the software programs 134 to access data (for example, electronic messages) stored external to the computing device 102 (for example, on the server 106 accessible over a communication network 104 such as the internet). The electronic processor 110 may output the results of processing the accessed to the display 160 included in the computing device 102.

Figure 3:
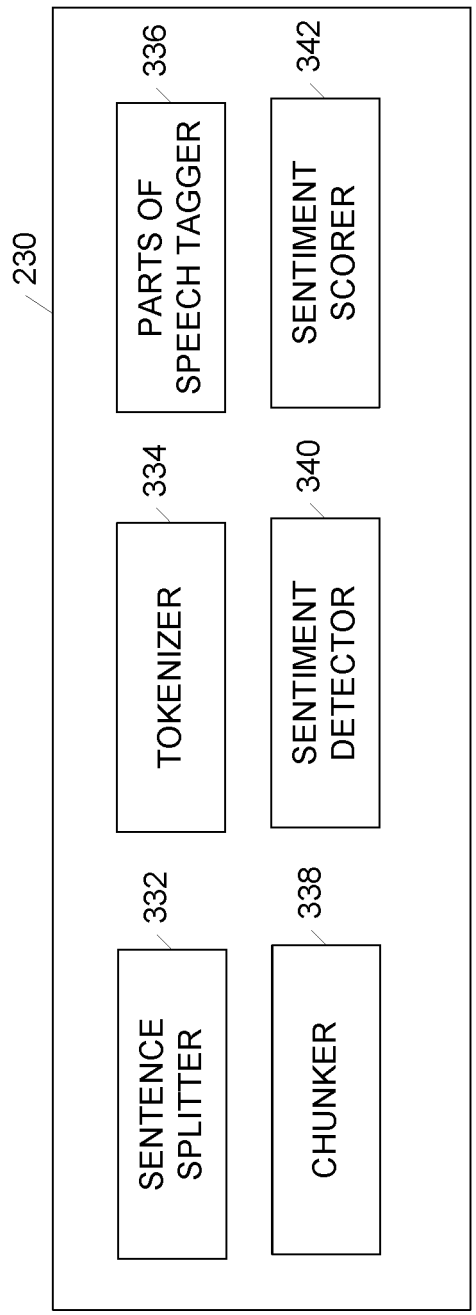
FIG. 3 illustrates a sentiment analyzer shown in FIG. 2, in accordance with some embodiments.

FIG. 3 illustrates a sentiment analyzer 230 shown in FIG. 2, in accordance with some embodiments. In some embodiments, the sentiment analyzer 230 includes a sentence splitter 332, a tokenizer 334, a parts-of-speech tagger 336, a chunker 338, a sentiment detector 340, and a sentiment scorer 342.

In some embodiments, the sentence splitter 332 receives an electronic message and recognizes the end of sentences by using a set of rules and divides the text of an electronic message into sentences. For example, a question mark or exclamation mark may always indicate the end a sentence. A period following by an upper-case letter generally ends a sentence, however, there are a number of exceptions. For example, if the period is part of an abbreviated title ("Mr.", "Gen.", etc.), it does not indicate the end a sentence. A period following a single capitalized letter is assumed to be a person's initial, and is not considered the end of a sentence.

In some embodiments, the tokenizer 334 breaks a stream of text (for example, a stream of text received from the sentence splitter 332) into words, phrases, symbols, or other meaningful elements called tokens. The list of tokens becomes input for further processing such as parsing or text mining. The tokenizer is also responsible for demarcating and classifying sections of a string of input characters. In some embodiments, the tokens are categorized by character content or by context within the electronic message such as whether they are nouns, verbs, adjectives, or punctuation.

In some embodiments, the parts-of-speech tagger 336 assigns a part-of-speech marker to each word in an electronic message. Parts-of-speech tagger 336 is useful for finding named entities like people or organizations in the text of the electronic message. Parts-of-speech tagger 336 performs the task of disambiguation where the goal is to find the correct tag for a particular situation. In some embodiments, the parts-of-speech tagger 336 is a piece of software that reads text in a particular language and assigns parts-of-speech to each word (and other token), such as noun, verb, adjective, preposition, pronoun, adverb, conjunction, interjection, etc.

In some embodiments, the chunker 338 receives the output of the parts-of-speech tagger 336 and groups words together to form phrases. In some embodiments, the chunker 338 extracts, well-formed phrases, or chunks, from a sentence. The function of chunker 338 includes defining rules or expressions that are then matched against an input sentence in the electronic message. One way to generate the rules and expressions is to train the chunker 338 by providing it already known phrases, or chunks.

In some embodiments, the sentiment detector 340 receives the phrases from the chunker 338 and estimates a sentiment for the phrases followed by the sentences and then the whole text contained in the electronic message created by a user.

In some embodiments, the sentiment scorer 342 determines a score associated with the sentiment determined at the sentiment detector 340. In some embodiments, the sentiment score is represented by a numerical value within the range of 0 to 1.

Figure 4:
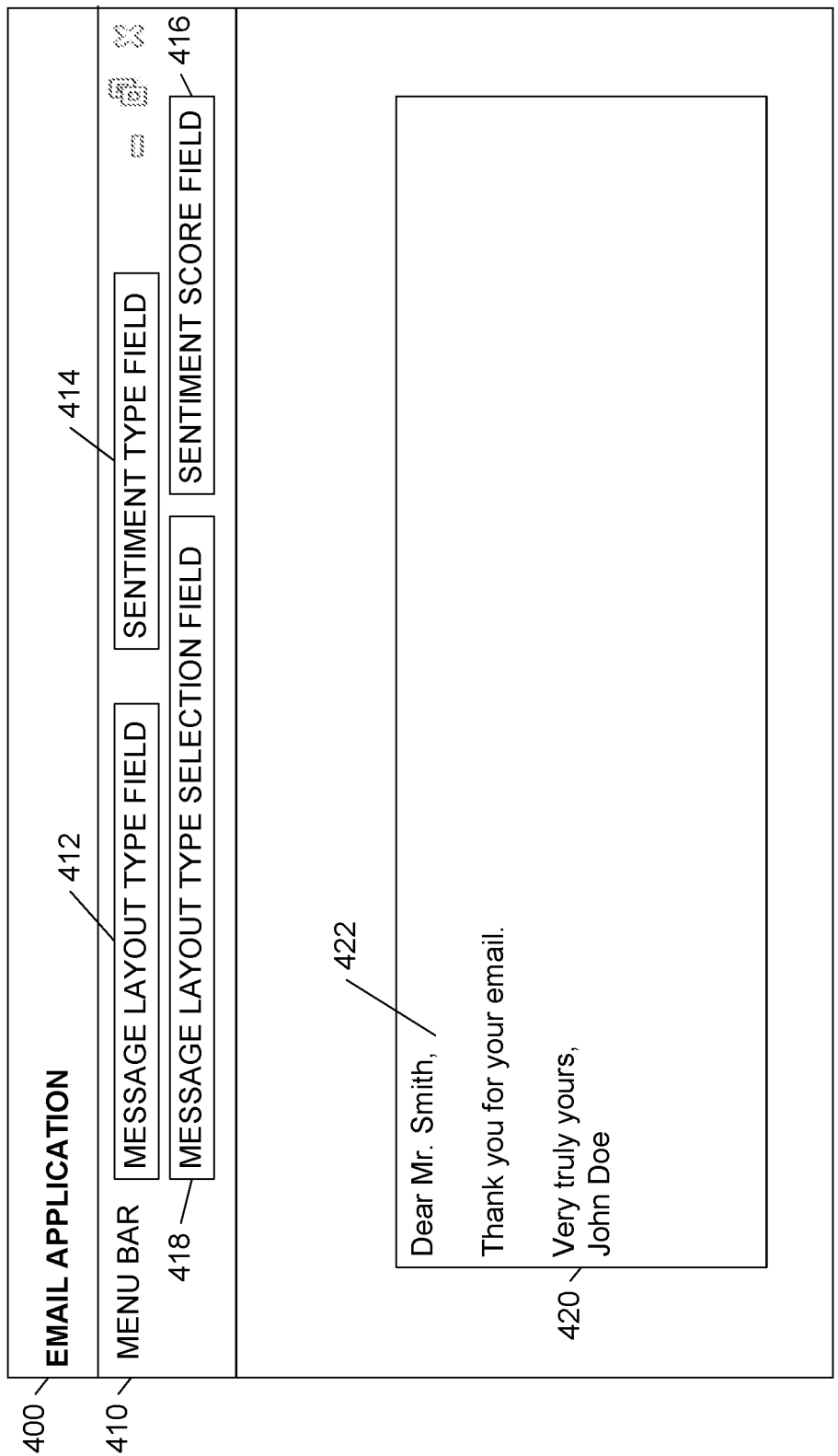
FIG. 4 illustrates a graphical user interface of an email application, in accordance with some embodiments.

FIG. 4 illustrates a graphical user interface (GUI) 400 of the email application 210 shown in FIG. 2, in accordance with some embodiments. In one example, the graphical user interface 400 includes a menu bar 410 and a text field 420 displaying an electronic message (for example, an email). In some embodiments, the menu bar 410 includes a message layout type field 412, a sentiment type field 414, and a sentiment score field 416. In one example, the message layout type field 412 is configured to display an indication (for example, "FORMAL" or "INFORMAL") based on the layout, format and/or the content of the electronic message 422 available within the text field 420. In some embodiments, the sentiment type field 414 is configured to display an indication (for example, "POSITIVE", "NEGATIVE", or "NEUTRAL") based on the sentiment of the electronic message 422. In some embodiments, the sentiment score field 416 is configured to display a numerical value (for example, a number within the range "0" to "1") indicating the sentiment of the electronic message 422.

In some embodiments, the menu bar 410 includes a drop-down menu (shown as message layout type selection field 418 in FIG. 4) that allows the user to choose a layout (for example, "FORMAL" or "INFORMAL") that the user desires as a format for an electronic message 422 composed by the user.

Figure 5:
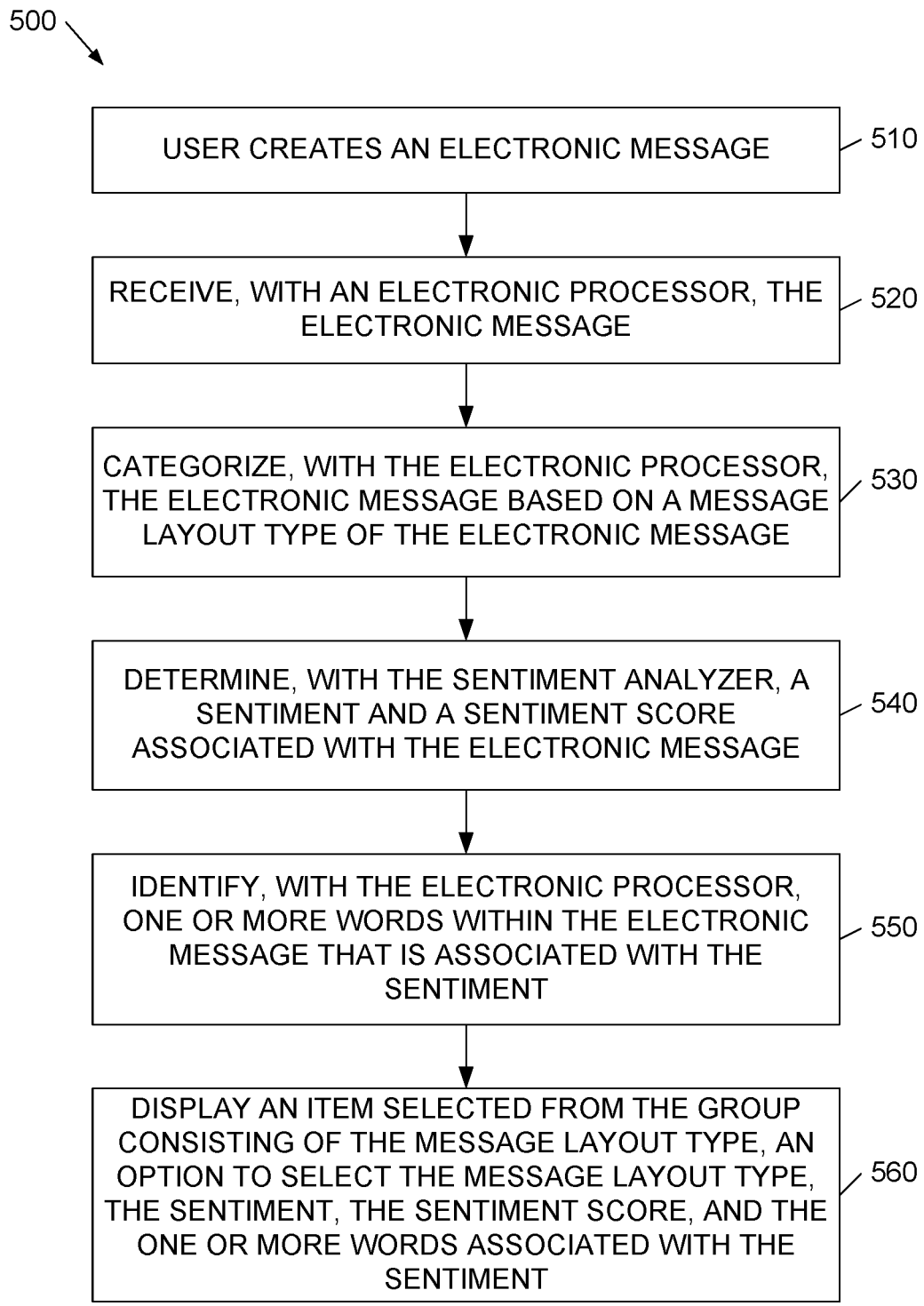
FIG. 5 is a flow chart of a method of authoring electronic messages, in accordance with some embodiments.

FIG. 5 illustrates a flow chart of a method 500 of authoring electronic messages, in accordance with some embodiments. At block 510 of method 500, the user creates such as the electronic message 422 shown in FIG. 4. This electronic message 422 can be either an email, a text message or other form of message from a computing device 102. At block 520 of method 500, the electronic processor 110 receives the electronic message 422 created by the user.

At block 530, the method 500 categorizes, with the electronic processor 110, the electronic message 422 based on a message layout type of the electronic message 422. In one example, when the layout type (for example, format) of the electronic message 422 is as shown in FIG. 4, the electronic message 422 may be determined as a formal message based on the structure and/or layout of the electronic message 422. After determination of the layout and/or format of the electronic message 422 is a formal message, the electronic processor configures the message layout type field 412 to "FORMAL." In some embodiments, the electronic message is determined as a formal message based on the syntax of the electronic message or the choice of words within the electronic message 422. For example, the use of "Dear Mr. Smith" or "Very truly yours" may be used by the electronic processor 110 to categorize the electronic message 422 as "FORMAL."

In another example that includes the following electronic message: "hey, client asked for a requirement doc. send it by Monday," the method 500 categorizes the electronic message as being "INFORMAL" upon detecting "hey" and the presence of improper start of a new sentence (for example, "send" having a lower case "s" instead of using a capitalized ("S")). Additionally, a lack of common courtesies such as "please", "thank you", "sincerely", etc. is used to determine that the electronic message is "INFORMAL." In some embodiments, the method 500 provides alternate suggestions to convert the informal message into a formal message. For example, the "INFORMAL" electronic message may be converted into a "FORMAL" electronic message to include the following:

Dear Sir/Madam,
Client has asked for a requirement document,
Could you please send the document by Monday?
Sincerely, At block 540 of method 500, the electronic processor 110 determines a sentiment and a sentiment score associated with the electronic message 422. In some embodiments, the sentiment is classified into a sentiment type (for example, a positive sentiment, a negative sentiment or a neutral sentiment). Additionally, in some embodiments, the sentiment score may be represented a number between "0" and "1". A number closer to "0" indicates the sentiment of the electronic message 422 to be "NEGATIVE" and a number closer to "1" indicates the sentiment of the electronic message 422 to be "POSITIVE".

In one example, the electronic message with the text,
"You overlooked specifying the color of the phone you want"
is determined to have a "NEGATIVE" sentiment with a sentiment score of "0.16".

At block 550 of method 500, the electronic processor 110 identifies one or more words within the electronic message 422 that is associated with the sentiment determined at block 540. In some embodiments, the presence of the word "overlooked" associated with "you" moves the sentiment of the electronic message 422 created by the user towards a negative sentiment. At block 560, the method 500 includes having the electronic processor 110 configured to display one or more of the message layout type, an option to select the message layout type, the sentiment, the sentiment score, and one or more words associated with the sentiment. In one example, for the electronic message provided above, the method 500 displays a "NEGATIVE" sentiment associated with the electronic message "You overlooked specifying the color of the phone you want". In one example, the method 500 also displays a sentiment score of "0.16" associated with this electronic message. In addition, the method 500 also displays or highlights the word "overlooked" that may be associated with the negative sentiment provided for the electronic message. In some embodiments, the method 500 displays alternate texts for the electronic message 422 corresponding to different sentiment types.

In one example, the method 500 displays the following text for the electronic that has a "NEUTRAL" sentiment:
"You forgot to specify the color of the phone you want"
In another example, the method 500 displays the following text for the electronic that has a "POSITIVE" sentiment:
"Thank you for sending the details for the phone you need. Could you please indicate your choice of color as well?"

Figure 6:
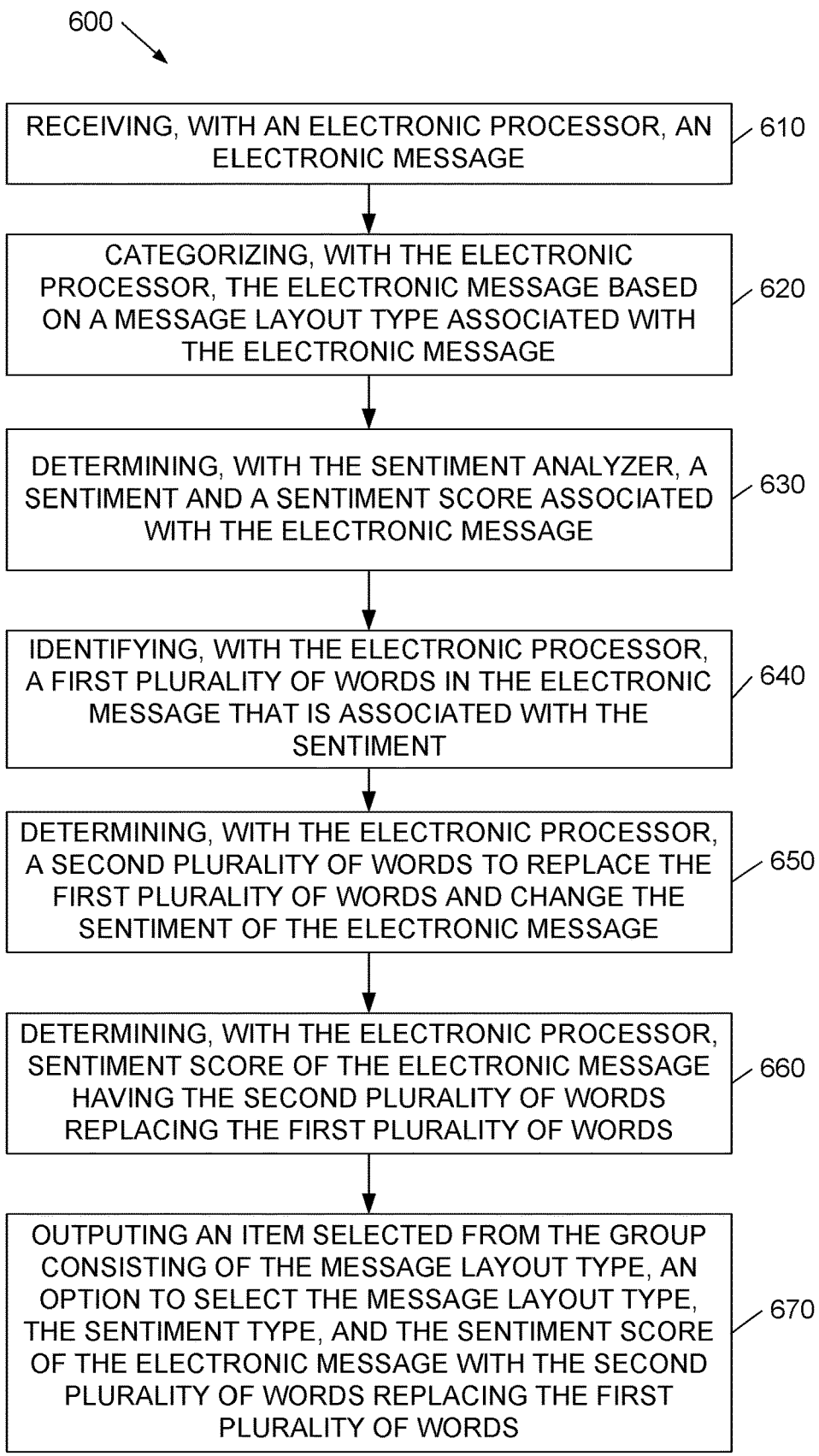
FIG. 6 is a flow chart of a method of authoring electronic messages, in accordance with some embodiments.

FIG. 6 illustrates flow chart of a method 600 of authoring electronic messages, in accordance with some embodiments. At block 610, the method 600 includes receiving, with an electronic processor 110, the electronic message 422. At block 620, the method 600 includes categorizing, with the electronic processor 110, the electronic message 422 based on a message layout type associated with the electronic message. In some embodiments, the message layout type may include either "FORMAL" or "INFORMAL".

At block 630, the method 600 includes determining, with the electronic processor 110, a sentiment (for example, "POSITIVE", "NEGATIVE" and "NEUTRAL") and a sentiment score (a numerical value between "0" to "1") associated with the electronic message. In some embodiments, the sentiment may also be classified as "HIGHLY POSITIVE" or "HIGHLY NEGATIVE" when the sentiment score is much closer to 1 or 0, respectively. In one example, the electronic message includes the following text, "I'm sorry to report that your grant proposal was among those that were not approved for funding in the spring. With the reduction in grant funds caused by budget cuts and the record number of applications, I'm afraid that many worthwhile proposals could not be supported."

For the above example, the sentiment type is estimated to be "HIGHLY NEGATIVE" with a sentiment score determined to be 0.08.

At block 640, the method 600 includes identifying, with the electronic processor 110, one or more words in the electronic message that is associated with the sentiment type. When the above text is analyzed using a sentiment analyzer 230, the method 600 identifies the words and phrases "budget cuts", "grant funds", record number of applications", "spring", "funding", "grant proposal", "reduction", and "worthwhile proposals" as impacting the sentiment of the electronic message. In some embodiments, identifying, with the electronic processor 110, the one or more words in the electronic message associated with the sentiment type includes highlighting the one or more words in the electronic message.

At block 650, the method 600 includes determining, with the electronic processor 110, alternate words to replace the one or more words identified at block 640 thereby changing the sentiment of the electronic message 422. At block 660, the method 600 includes determining, with the electronic processor 110, a sentiment type and a sentiment score. In some embodiments, the method 600 includes using a synonym dictionary to generate synonyms for the one or more words identified at block 640 to generate an alternative version of the above electronic message. For example, the alternative version may have the following text:

"I am sorry to report that your grant proposal was among those that were not approved for financial support in the spring. With the decrease in grant funds caused by budget cuts and the record number of applications, I am afraid that many worthwhile proposition could not be supported."

The sentiment score of the above text is determined to be "0.25," which is still negative but provides a better option that the initial electronic message that had a sentiment score of "0.08."

At block 670, the method 600 includes outputting one or more of the message layout type, an option to select the message layout type, the sentiment type and the sentiment score of the electronic message with the alternate words (determined at block 650) replacing the one or more words (identified at block 640). For the example electronic message provided above, the method 600 displays the sentiment type "NEGATIVE," and the sentiment score "0.25," and the alternative version of the electronic message including the words that were replaced to affect the sentiment of the overall electronic message which was previously determined to have a sentiment score of "0.08".

In some embodiments, the server 106 may execute the software described herein, and a user may access and interact with the software application using the computing device 102. Also, in some embodiments, functionality provided by the software application as described above may be distributed between a software application executed by a user's personal computing device and a software application executed by another electronic process or device (for example, a server) external to the computing device 102. For example, a user can execute a software application (for example, a mobile application) installed on his or her smart device, which may be configured to communicate with another software application installed on the server 106.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Various features and advantages of some embodiments are set forth in the following claims.

What is claimed is:

1. A computing device, the computing device comprising: an electronic processor configured to receive a first fully composed electronic message;
   generate a graphical user interface that includes the first electronic message;
   categorize the first electronic message based on a message layout type associated with the first electronic message;
   determine, with a sentiment analyzer, a first sentiment type and a first sentiment score associated with the first electronic message;
   identify a first plurality of words, phrases, or both in the first fully composed electronic message and associated with the first sentiment type;
   determine a second plurality of words, phrases, or both for replacing the first plurality of words, phrases, or both in the first fully composed electronic message;
   create a second fully composed electronic message having the second plurality of words, phrases, or both replacing the first plurality of words, phrases, or both in the first fully composed electronic message and changing the first sentiment score of the first fully composed electronic message;
   determine a second sentiment score and a second sentiment type associated with the second electronic message;
   output the second electronic message if the second sentiment score is greater than the first sentiment score; and
   output one or more selected from the group consisting of the message layout type, an option to select the message layout type, the second plurality of words, phrases, or both, the second sentiment type, and the second sentiment score associated with the second electronic message.

2. The computing device of claim 1, wherein the graphical user interface includes a message layout type field to display the layout type of the first and second electronic message.

3. The computing device of claim 1, wherein the graphical user interface includes a sentiment type field.

4. The computing device of claim 3, wherein a sentiment type of the sentiment type field is selected from a group consisting of a positive sentiment, a neutral sentiment, and a negative sentiment.

5. The computing device of claim 4, wherein the graphical user interface includes a sentiment score field.

6. The computing device of claim 5, wherein a sentiment score of the sentiment score field is a numerical value within a range of 0 to 1.

7. A method for authoring an electronic message, the method comprising:
   receiving, with an electronic processor, a first fully composed electronic message;
   categorizing, with the electronic processor, the first electronic message based on a message layout type of the first electronic message;
   determining, with a sentiment analyzer, a first sentiment type and a first sentiment score associated with the first electronic message;
   identifying, with the electronic processor, a first plurality of words, phrases, or both in the first fully composed electronic message and associated with the first sentiment type;
   determining, with the electronic processor, a second plurality of words, phrases, or both for replacing the first plurality of words, phrases, or both and changing the first sentiment score of the first fully composed electronic message;
   creating a second fully composed electronic message having the second plurality of words, phrases, or both replacing the first plurality of words, phrases, or both in the first fully composed electronic message;
   determining, with the electronic processor, a second sentiment score and a second sentiment type of the second electronic message;
   outputting the second electronic message if the second sentiment score is greater than the first sentiment score; and
   outputting an item selected from the group consisting of the message layout type, an option to select the message layout type, the second sentiment type, and the second sentiment score of the second electronic message.

8. The method of claim 7, wherein categorizing the first electronic message based on the message layout type of the first electronic message includes categorizing the first electronic message into the message layout type selected from a group consisting of a formal message and an informal message.

9. The method of claim 8, wherein outputting the message layout type includes displaying the message layout type selected from a group consisting of a formal message and an informal message.

10. The method of claim 7, wherein the first sentiment type is one selected from a group consisting of a positive sentiment, a neutral sentiment, and a negative sentiment and the second sentiment type is one selected from a group consisting of a positive sentiment, a neutral sentiment, and a negative sentiment.

11. The method of claim 10, wherein outputting the second sentiment type includes displaying one selected from a group consisting of a positive sentiment, a neutral sentiment, and a negative sentiment.

12. The method of claim 7, wherein determining the first sentiment score and the second sentiment score includes determining a numerical value within a range of 0 to 1.

13. The method claim 12, wherein outputting the second sentiment score includes displaying a numerical value within a range of 0 to 1.

14. The method of claim 7, wherein determining the second plurality of words, phrases, or both for replacing the first plurality of words, phrases, or both in the first fully composed electronic message includes generating synonyms for the first plurality of words, phrases, or both.

15. The method of claim 7, wherein identifying, with the electronic processor, the first plurality of words, phrases, or both in the first fully composed electronic message associated with the sentiment type includes highlighting the first plurality of words, phrases, or both in the first fully composed electronic message.

16. The method of claim 14, wherein determining the second plurality of words, phrases, or both for replacing the first plurality of words, phrases, or both in the first fully composed electronic message includes displaying a selection of words, phrases, or both to replace the first plurality of words, phrases, or both.

17. A non-transitory computer-readable medium containing computer-executable instructions that when executed by one or more processors cause the one or more processors to:
   receive a first fully composed electronic message;
   categorize the first electronic message based on a message layout type of the first electronic message;
   determine, with a sentiment analyzer, a first sentiment type and a first sentiment score associated with the first electronic message;
   identify, with the sentiment analyzer, a first plurality of words, phrases, or both in the first fully composed electronic message and associated with the first sentiment type;
   determine a second plurality of words, phrases, or both for replacing the first plurality of words, phrases, or both in the first fully composed electronic message and changing the first sentiment score of the first fully composed electronic message;
   create a second fully composed electronic message having the second plurality of words, phrases, or both replacing the first plurality of words, phrases, or both;
   determine a second sentiment score and a second sentiment type associated with the second electronic message having the second plurality of words, phrases, or both replacing the first plurality of words, phrases, or both in the first fully composed electronic message;
   output the second electronic message having the second plurality of words, phrases, or both replacing the first plurality of words, phrases, or both message if the second sentiment score is greater than the first sentiment score; and
   output one or more selected from the group consisting of the message layout type, the second sentiment type, and the second sentiment score associated with the second electronic message.

18. The non-transitory computer-readable medium of claim 17, wherein the one or more electronic processors is configured to output the first sentiment type and the first sentiment score associated with the first electronic message.

19. The computing device of claim 1, wherein determining, with the sentiment, analyzer, the first sentiment type and the first sentiment score associated with the electronic message includes determining the first sentiment score based on one or more chunks of the first electronic message.

20. The computing device of claim 1, wherein the sentiment analyzer includes a sentence splitter, a tokenizer, a parts-of-speech tagger, and a chunker.

21. The computing device of claim 20, wherein determining, with the sentiment analyzer, the first sentiment type and the first sentiment score associated with the first electronic message includes:
   splitting the first electronic message into a plurality of sentences using the sentence splitter;

breaking each sentence of the plurality of sentences into one or more tokens using the tokenizer; and classifying each token of the one or more tokens using the tokenizer.

22. The computing device of claim 21, wherein determining, with the sentiment analyzer, the first sentiment type and the first sentiment score associated with the first electronic message includes:

assigning a part of speech to each token classified as a word of the one or more tokens using the parts-of-speech tagger;

grouping at least one token classified as a word of the one or more token to form chunks using the chunker;

determining the first sentiment type based on the chunks using a sentiment detector; and determining the first sentiment score based on the first sentiment type using a sentiment scorer.

\* \* \* \* \*